A. R. ROGERS.
FISH CUTTING MACHINE.
APPLICATION FILED JAN. 24, 1920.

1,394,185.

Patented Oct. 18, 1921.
4 SHEETS—SHEET 3.

Inventor:
Arthur R. Rogers
By Munday, Clarke &
Carpenter Attys.

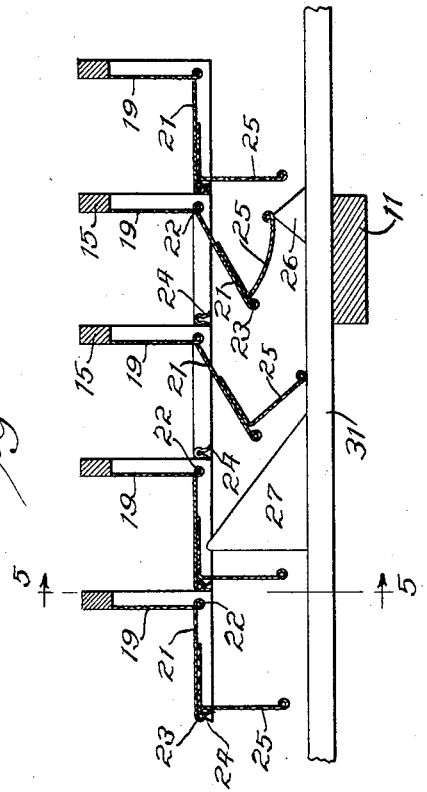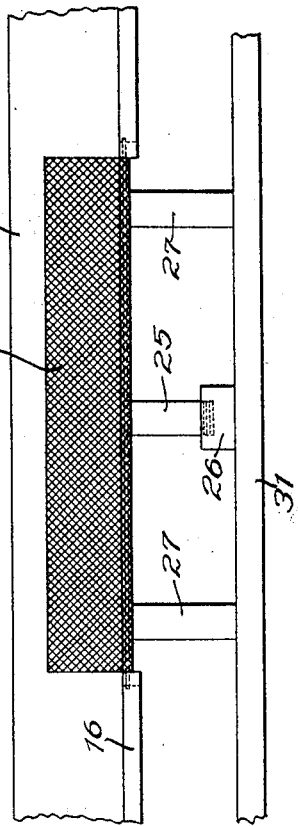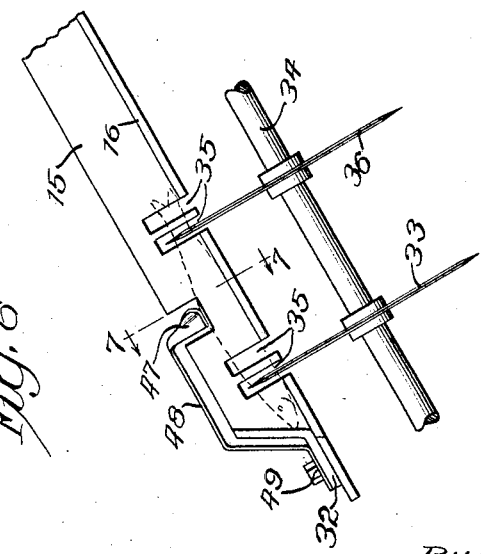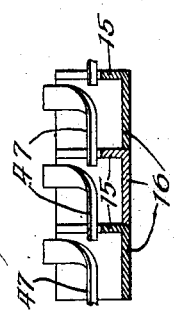

UNITED STATES PATENT OFFICE.

ARTHUR R. ROGERS, OF JONESPORT, MAINE, ASSIGNOR TO AMERICAN CAN COMPANY, OF NEW YORK, N. Y., A CORPORATION OF NEW JERSEY.

FISH-CUTTING MACHINE.

1,394,185.  Specification of Letters Patent.  Patented Oct. 18, 1921.

Application filed January 24, 1920. Serial No. 353,833.

*To all whom it may concern:*

Be it known that I, ARTHUR R. ROGERS, a citizen of the United States, residing in Jonesport, in the county of Washington and State of Maine, have invented a new and useful Improvement in Fish-Cutting Machines, of which the following is a specification.

This invention relates in general to fish decapitating machines and has for its object broadly the provision of a machine of extremely rapid operation and high capacity. In the fish canning industry the run of fish is very irregular and at times a very heavy run will suddenly begin and the fish are caught with extreme rapidity and because of their quick spoilage it is desirable that they be handled as quickly and efficiently as possible.

The invention has for its major purpose the provision of a multiple machine of extremely rapid and efficient action.

The invention has also numerous minor other objects relating to various features which may be used in other machines, an example of such objects being the provision of new and effective means for insuring proper gaging, proper delivery of the fish to the gaging and cutting devices, proper holding means for the fish during decapitation, etc.

On the drawings,

Fig. 4 is an enlarged detail section of the fish sorting and discharging devices;

Fig. 5 is a partial view taken at right angles to Fig. 4 and of the same portion of the apparatus;

Fig. 6 is an enlarged detail of the cutting devices; and

Fig. 7 is a fragmentary section of the devices for holding the fish during the decapitation.

Figure 1:
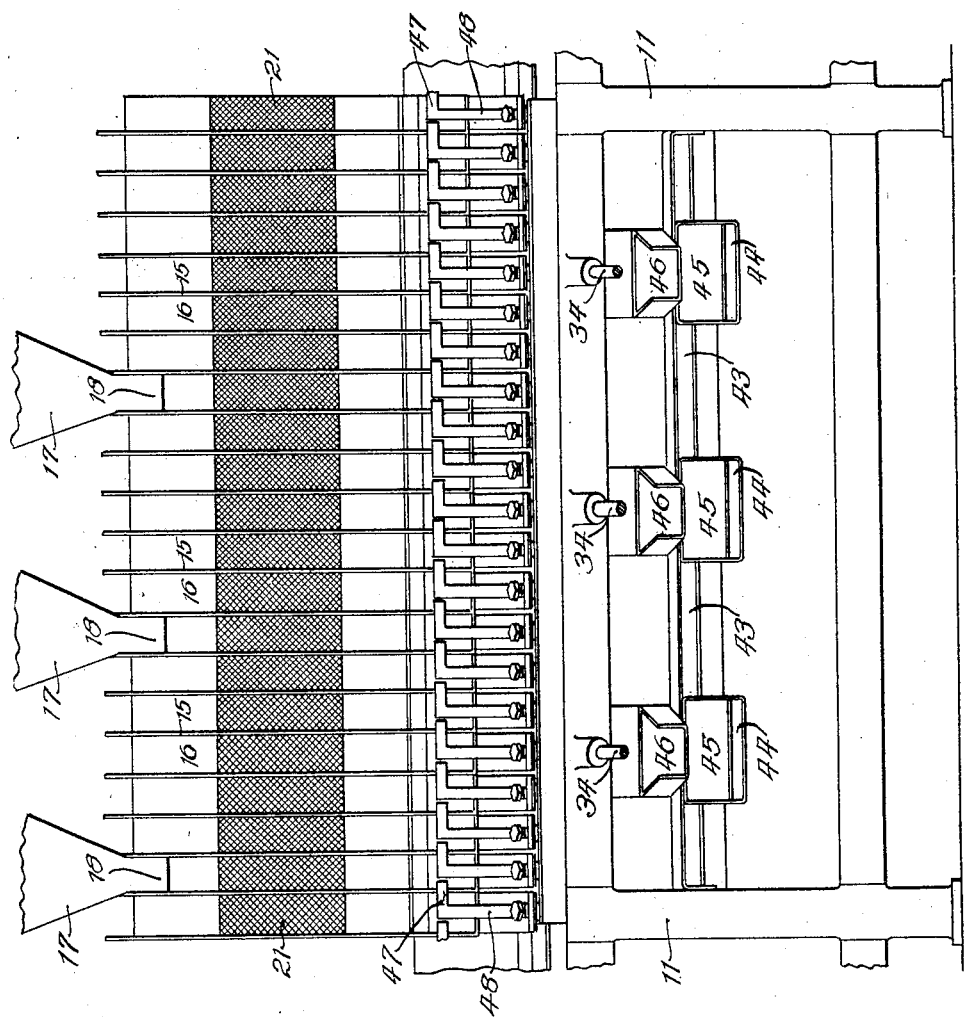
Figure 1 is a side view of an apparatus embodying my present invention.
Figure 2:
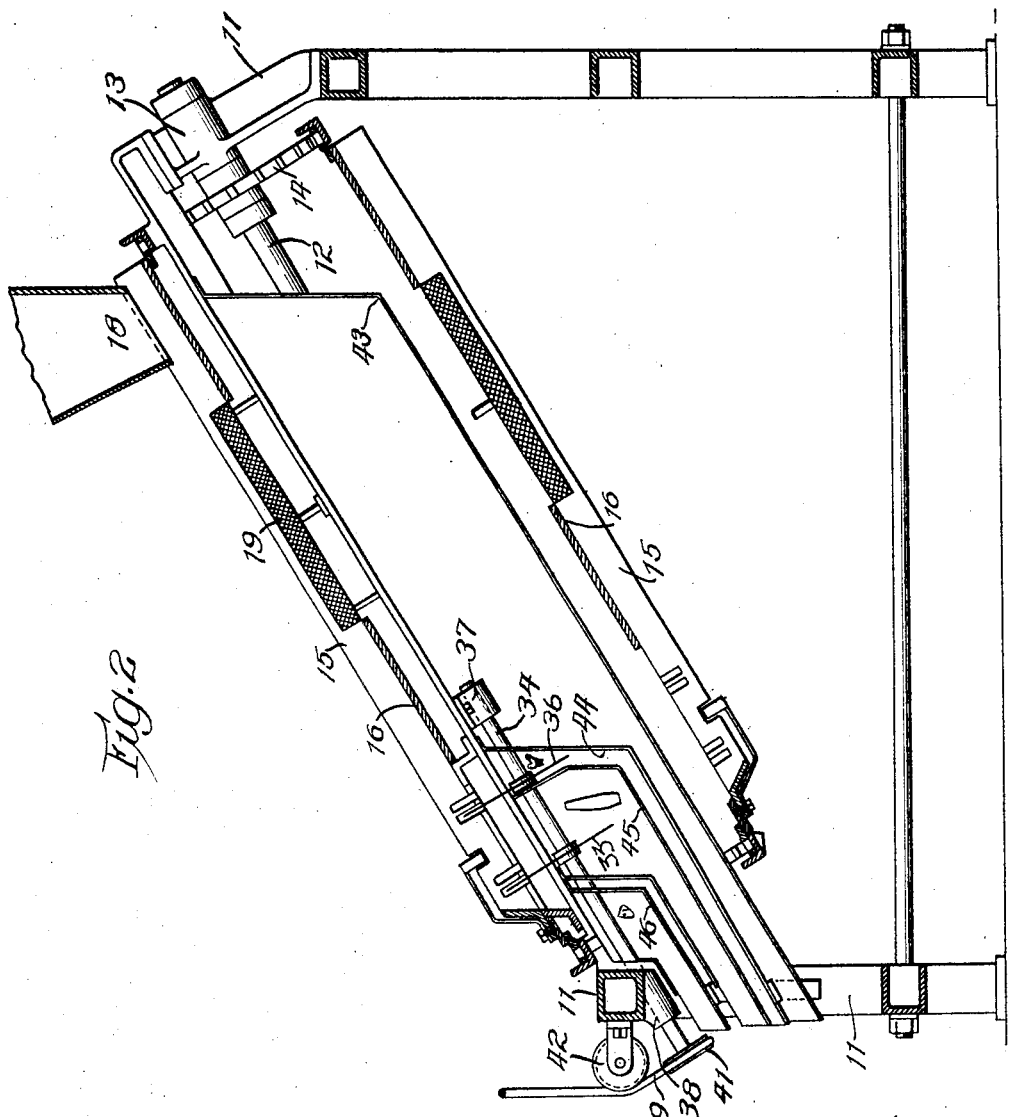
Fig. 2 is a vertical sectional view through the same.
Figure 3:
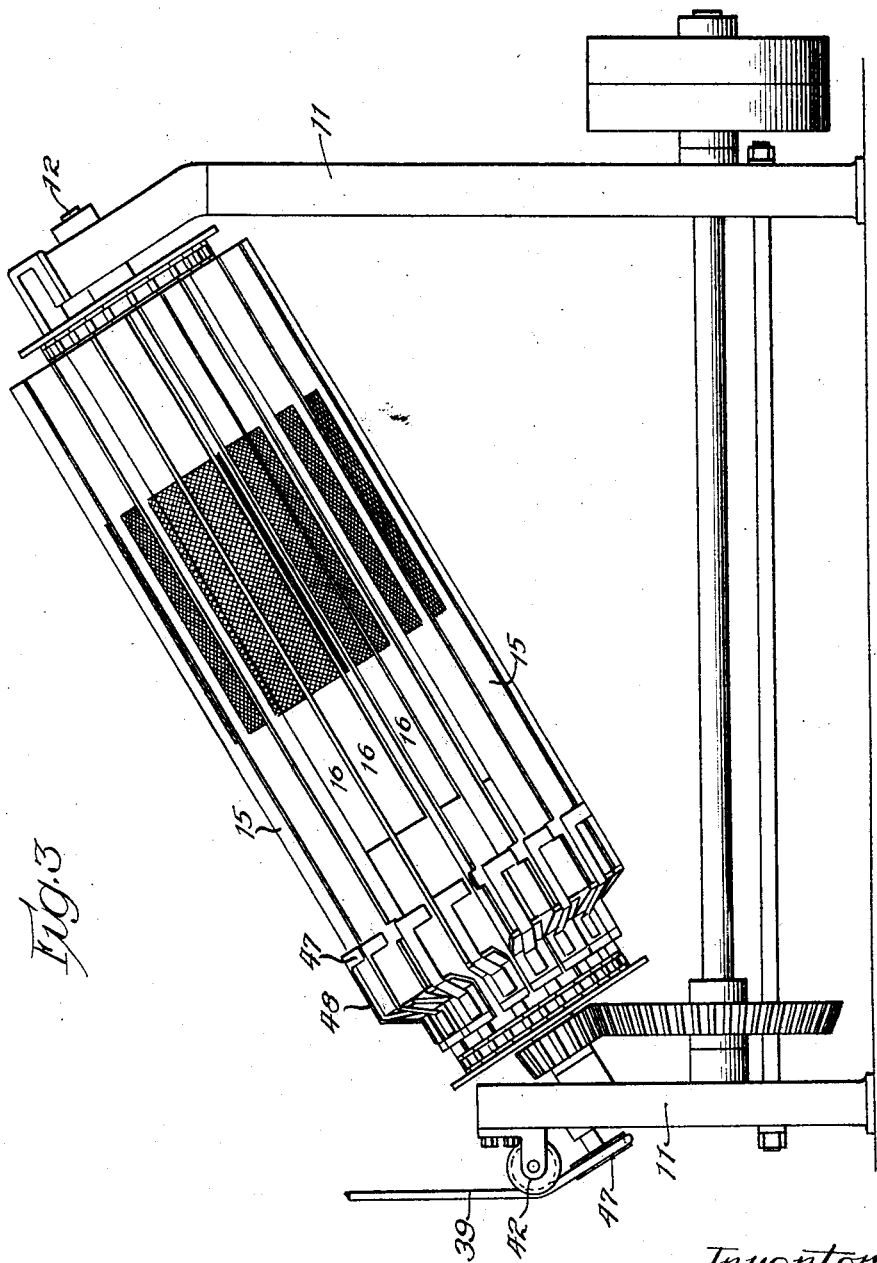
Fig. 3 is an end elevation thereof.

This invention contemplates the provision of a number of hoppers or other fish feeding devices arranged at spaced intervals along one side of the travel of a continuously moving conveyer made up of inclined chutes into which the fish are continuously fed from the hopper and down which they slide to a plurality of sets of cutting devices arranged at spaced intervals and past which the fish are carried in the movement on the conveyer. An elongated frame 11 of any suitable form and construction is provided and carries inclined shafts 12 located one at each end and having bearings at 13 in the frame. Each of these shafts is provided with a pair of sprocket wheels 14 over which moves a conveyer composed of a number of chutes or channels formed by angle members suitably connected together to form a conveyer or belt trained upon the sprocket wheels 14. Each of these channel members is formed by upstanding partition walls 15 and base parts 16.

Referring to Fig. 1 it will be noted that a number of hoppers 17 are provided and arranged at spaced intervals along the upper travel of the conveyer. These hoppers are narrowed at their bottoms at 18 to substantially the width of the chutes and fish are fed continuously from the several hoppers into the chutes as they pass. The fish fall into the chutes with their heads or tails pointing down. Means are provided to retain and subsequently deliver the fish arranged in the chute with their tails first and these means in the present instance comprise screen parts arranged at the sides and bottom of a part of each chute and screen section 19 is let into the partition wall between the chutes and the screen bottom 21 is positioned in registration therewith. These screen parts catch the fins and scales of the fish sliding down tail first and retain them. At properly arranged locations devices are provided to cause the screen parts 21 in the bottoms of the chutes to drop down and permit the fish thus held to be discharged out of the conveyer and returned to the hoppers.

Each part 21 is pivoted at 22 along an edge of the chute and has at its free edge a rod 23 adapted for yielding engagement in holders 24 arranged at each end of the bottom screen part. An arm 25 extends down from the center of the forward edge of each screen part 21 and is adapted for engagement by detents 26 mounted in the travel of the chute in position to engage the arm 25 and pull the rod 23 out of the holder 24 dropping it as may be seen in Fig. 4 and permitting the fish held in the screen to drop out. Further travel of the conveyer brings the free edge of the screen part 21 containing the rod to inclined elevating means or blocks 27 which lift it back into position and cause the ends of the rods to snap into the holders 24.

The arrangement of the described parts is such that a cut fish is removed from each channel after it passes the cutting knife, and a fish to be cut is supplied to each channel of the conveyer after the operation of the discharging means of such channel and before the channel arrives at the next successive cutting knife.

Near the bottom of the chute is located a continuous fixed table 31, the bottom being cut away so that this table forms a continuation of the bottom of the chute. Gaging angle members 32 are positioned in the conveyer at the lower end of the fixed table 31 and the fish slide down the chute on to the fixed table and against the gaging members 32.

Decapitating knives 33 are mounted upon shafts 34 taking through slots 35 in partition walls 15. These knives are arranged at intervals and in predetermined relation with respect to the hoppers. If desired knives 36 may also be provided to cut off the tails of the fish. The shafts 34 are mounted in bearings 37 and 38 in the frame and are driven by a round belt or other flexible drive 39 taking over pulleys 41 on the shaft ends and over guide pulleys 42 carried on the frame.

Means are provided to receive the head, the body and the tails of the fish and also to receive the fish that are separated out by reason of their improper tail first arrangement in the chute and these means deliver the fish at the lower end of the apparatus. An apron 43 is arranged beneath the upper screen travel and receives the fish which were arranged tail first in the chute. A second apron 44 is positioned above the apron 43 and near the lower side of the machine to receive the tails of the fish, another apron 45 similarly arranged receives the bodies and still a fourth apron 46 receives the heads.

Spring pressed means are provided to hold the fish against lifting during the decapitating operation and these means comprise leaves 47 upon the ends of swinging arms 48 fastened at 49 upon the gaging members 32.

The fish are fed from the hopper as fast as it is possible for the cutters to take care of them. Those falling head first into the chute pass the screen portions without any retardation and slide down into rapid gaged position where they are held by the spring holding means 47 during the decapitating operation, the ends resting against the gaging bars 32. The decapitating blades or cutting knives are of very thin steel disks, highly tempered and extremely sharp and they are driven at a high rate of speed by any suitable means overhead (not shown on the drawing).

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for decapitating fish, the combination of a frame, a plurality of cutters arranged at intervals therein, and means common to all said cutters for delivering fish to said cutters for decapitation.

2. In an apparatus for decapitating fish, the combination of a frame, a plurality of cutters arranged at intervals therein, and conveying means movable progressively past said cutters for delivering fish thereto.

3. In an apparatus for decapitating fish, the combination of a frame, a plurality of cutters arranged at intervals therein, and conveying means movable progressively past said cutters for delivering fish thereto in gaged relation.

4. In an apparatus for decapitating fish, the combination of a frame, a plurality of cutters arranged at intervals therein, a plurality of fish feeding means, and conveyer means common to said cutter and said feeding means for delivering fish fed from said fish feeding means to said cutter.

5. In an apparatus for decapitating fish, the combination of a frame, a plurality of cutters arranged at intervals therein, a plurality of fish feeding means, and conveyer means common to said cutters and said feeding means for delivering fish fed from said fish feeding means to said cutter in gaged relation.

6. In an apparatus for decapitating fish, the combination of a frame, a plurality of cutters arranged at intervals therein, a plurality of fish feeding means fixed in relation to said cutters, and conveyer means movable past said cutters and said feeding means for delivering fish fed from said fish feeding means to said cutter.

7. In an apparatus for decapitating fish, the combination of a frame, a plurality of cutters arranged at intervals therein, a plurality of fish feeding means, and continuously moving coveyer means for receiving fish from the feeding means and delivering them to said cutters.

8. In an apparatus for decapitating fish, the combination of successive spaced cutting devices, a conveyer movable past said cutting devices and holding the fish in gaged relation, and means movable with said conveyer for holding said fish against said cutting devices in the decapitating operation.

9. In an apparatus for decapitating fish, the combination of successive spaced cutting devices and a continuously moving conveyer movable past said cutting devices and from one cutting device to another and holding the fish in gaged relation in the decapitating operation.

10. In an apparatus for decapitating fish, the combination of successive pairs of cutting knives, and a conveyer movable past said cutting knives and from one pair of knives to another pair and holding the fish in gaged relation in the decapitating operation.

11. In an apparatus for decapitating fish, the combination of cutting means, a fixed table located at said cutting means, and a movable conveyer for delivering fish to said cutting means, said conveyer moving the fish across said fixed table during the decapitation and having movable bottom portions for discharging the fish.

12. In an apparatus for decapitating fish, the combination of cutting means, and a movable conveyer for delivering fish to said cutting means, said conveyer having channels each of which is provided with a movable bottom portion for discharging the fish.

13. In an apparatus for decapitating fish, the combination of successive spaced cutting devices, a movable conveyer for delivering fish to the several cutting devices simultaneously, and means operating between one cutting device and the next cutting device for removing the cut fish.

14. In a fish cutting machine the combination of a frame, fish conveying means comprising a plurality of movable chutes, a series of successive spaced decapitating knives, gaging means whereby the fish are arrested in alinement with said knives, means carried by each of said chutes to discharge the fish after cutting by said knives, means arranged in advance of each knife for supplying fish to the channels which are advancing to said knife, and means for operating said discharging means of each channel before an uncut fish is supplied thereto.

15. In an apparatus for decapitating fish, the combination of cutting means, a movable conveyer for delivering fish to said cutting means, and means carried by the conveyer for insuring that the fish delivered to the cutting means will be arranged in proper position for decapitation.

16. In an apparatus for decapitating fish, the combination of cutting means, and a movable conveyer along which the fish move to the cutting means, said conveyer having means for engaging the fins and scales of fish moving tail first thereon to prevent the fish reaching the cutting means.

17. In an apparatus for decapitating fish, the combination of cutting means, and a movable conveyer along which the fish move to the cutting means, said conveyer having screen parts for engaging the fins and scales of fish moving tail first thereon to prevent the fish reaching the cutting means.

18. In an apparatus for decapitating fish, the combination of cutting means, and a movable conveyer along which the fish move to the cutting means, said conveyer having means for engaging the fins and scales of fish moving tail first thereon to prevent the fish reaching the cutting means, and means for discharging said fish out of said conveyer.

19. In an apparatus for decapitating fish, the combination of cutting means, and a movable conveyer along which the fish move to the cutting means, said conveyer having screen parts for engaging the fins and scales of fish moving tail first thereon to prevent fish reaching the cutting means, and means moving said screen parts for discharging said fish out of said conveyer.

20. In an apparatus for decapitating fish, the combination of a hopper in which a considerable number of fish may be deposited, chutes movable past said hopper and for receiving fish therefrom, and means located adjacent the lower ends of said chutes for severing the heads from the body.

21. In an apparatus for decapitating fish, the combination of a plurality of hoppers in which a considerable number of fish may be deposited, chutes movable past said hoppers and for receiving fish therefrom, and means located adjacent the lower ends of said chutes for severing the heads from the body.

22. In an apparatus for decapitating fish, the combination of a hopper in which a considerable number of fish may be deposited, inclined chutes movable past said hopper and for receiving fish therefrom, and means located adjacent the lower ends of said chutes for severing the heads from the body.

23. In an apparatus for decapitating fish, the combination of a hopper in which a considerable number of fish may be deposited, chutes movable past said hopper and for receiving fish therefrom, and means located adjacent the lower ends of said chutes for severing the heads and tails from the body.

24. In an apparatus for decapitating fish, the combination of a hopper in which a considerable number of fish may be deposited, chutes movable past said hopper and for receiving fish therefrom, and means past which said chutes move for severing the heads from the body.

25. In an apparatus for decapitating fish, the combination of a hopper in which a considerable number of fish may be deposited, chutes movable past said hopper and for receiving fish therefrom, and means past which said chutes move for severing the heads and tails from the body.

26. In an apparatus for decapitating fish, the combination of a frame, a continuously moving conveyer therein and comprising a plurality of chutes, spaced fish feeding means and decapitating knives located on opposite sides of the travel of said chutes.

27. In an apparatus for decapitating fish, the combination of a frame, a continuously moving conveyer therein and comprising a plurality of chutes, spaced fish feeding means and decapitating knives located on opposite sides of the travel of said chutes, and means in the chutes for sorting the fish passing therethrough.

28. In an apparatus for decapitating fish, the combination of a frame, a continuously moving conveyer therein and comprising a plurality of chutes, spaced fish feeding means, decapitating knives located on opposite sides of the travel of said chutes, and screen parts in said chutes for retaining fish passing tail first therethrough.

29. In a fish cutting machine the combination of a series of fish supplying means, a series of fish cutting means, fish conveying means movable past said supplying means and cutting means, and devices for discharging cut fish from said conveying means at points between a cutting means and the next succeeding supplying means.

ARTHUR R. ROGERS.